United States Patent
Brelivet et al.

(10) Patent No.: US 12,051,937 B2
(45) Date of Patent: Jul. 30, 2024

(54) CONTROLLING A WIRELESS POWER TRANSFER SYSTEM

(71) Applicant: EnerSys Delaware Inc., Reading, PA (US)

(72) Inventors: Damien Brelivet, Arras (FR); Maxime Roudaut, Arras (FR); Patrick Dehem, Vitry en Artois (FR); Paul Antoine Gori, Arras (FR); David Letombe, Arras (FR)

(73) Assignee: EnerSys Delaware Inc., Reading, PA (US)

( * ) Notice: Subject to any disclaimer, the term of this patent is extended or adjusted under 35 U.S.C. 154(b) by 164 days.

(21) Appl. No.: 17/026,811

(22) Filed: Sep. 21, 2020

(65) Prior Publication Data

US 2021/0091591 A1 Mar. 25, 2021

(30) Foreign Application Priority Data

Sep. 23, 2019 (EP) .................................... 19306168

(51) Int. Cl.
*H02J 7/04* (2006.01)
*H02J 50/12* (2016.01)

(52) U.S. Cl.
CPC ................ *H02J 7/04* (2013.01); *H02J 50/12* (2016.02); *H02J 2207/20* (2020.01)

(58) Field of Classification Search
None
See application file for complete search history.

(56) References Cited

U.S. PATENT DOCUMENTS

| | | | |
|---|---|---|---|
| 9,979,238 B2 | 5/2018 | Misawa | |
| 2018/0342878 A1* | 11/2018 | Nagaoka | ................. B60L 50/60 |
| 2020/0412171 A1* | 12/2020 | Hanabusa | ........... H02J 7/00712 |
| 2021/0178915 A1* | 6/2021 | Tombelli | ................... H02J 7/04 |

FOREIGN PATENT DOCUMENTS

EP 2924841 A1 9/2015

OTHER PUBLICATIONS

"Communication Pursuant to Article 94(3) EPC, corresponding to European Patent Application No. 19306186.6-1202, mailing date Feb. 28, 2022, 4 pages".
Extended European Search Report corresponding to European Patent Application No. 19306168.6 (date mailed Nov. 15, 2019) (8 pages).

* cited by examiner

*Primary Examiner* — Daniel Kessie
*Assistant Examiner* — Terrence R Willoughby
(74) *Attorney, Agent, or Firm* — Myers Bigel, P.A.

(57) ABSTRACT

A method of controlling a wireless power transfer system comprising a primary stage and a secondary stage is provided. The primary stage comprises a DC/DC converter configured to generate a DC output, a DC/AC inverter configured to receive the DC output and to generate an AC output according to a variable switching frequency, and a primary coil configured to transfer power to the secondary stage in response to the DC/AC inverter generating the AC output. The switching frequency of the DC/AC inverter is adjusted to cause a phase angle between an input current and an input voltage of the primary coil to be less than or equal to a predetermined threshold. The DC output of the DC/DC converter is controlled to cause a desired amount of power to be transferred from the primary coil at the adjusted switching frequency.

16 Claims, 8 Drawing Sheets

CONTROLLING A WIRELESS POWER TRANSFER SYSTEM

CROSS-REFERENCE TO RELATED APPLICATION

The present disclosure claims priority to European Patent Application No. 19306168.6, filed on Sep. 23, 2019, in the European Patent Office, the entire contents of which are incorporated by reference in their entireties for all purposes.

TECHNICAL FIELD

The present disclosure relates to a wireless power transfer system. The present disclosure also relates to a method of controlling a wireless power transfer system.

BACKGROUND

Wireless power transfer (WPT) relates to the wireless transmission of electrical energy from a primary (transmitting) side to a secondary (receiving) side. Energy may be transferred via electromagnetic induction from the primary side to the secondary side. The primary side may be situated in a charging station, for example, and the secondary side may be electrically coupled to a chargeable battery. Wireless charging may be used in many applications, such as the charging of electrically powered vehicles. For example, a forklift truck may have an on-board battery pack which may be charged wirelessly when the forklift truck is positioned sufficiently close to a charging station for near-field, or inductive, coupling to occur.

Some WPT systems are configured to have comparable input and output voltages. An example of such a known WPT system is shown in FIG. 1.

Referring to FIG. 1, the WPT system 100 comprises a primary stage 110 and a secondary stage 120. The primary stage 110 and the secondary stage 120 are magnetically coupled to one another. The WPT system 100 is configured to charge a battery 130 that is coupled to the secondary stage 120.

The primary stage 110 comprises a rectifier 111 configured to rectify a 3-phase alternating current (AC) input signal. The rectifier 111 produces a direct current (DC) output. The primary stage 110 also comprises a direct current to alternating current (DC/AC) inverter 112. The DC/AC inverter 112 receives the DC output from the rectifier 111 and produces an AC output. The DC/AC inverter 112 operates at a fixed (or quasi-fixed) switching frequency. The DC/AC inverter 112 is configured to power a resonant tank 113. For example, the resonant tank 113 may comprise an LC resonant circuit. The resonant tank 113 is connected to a primary coil 114.

The secondary stage 120 comprises a secondary coil 121. The secondary coil 121 is coupled to the primary coil 114, e.g. via a magnetic coupling. The primary coil 114 is configured to transfer power to the secondary coil 121. The secondary coil 121 is connected to a resonant tank 122. The secondary stage also comprises a rectifier 123. The rectifier 123 is configured to rectify the power from the resonant tank 122. The rectifier 123 converts an AC signal to a DC signal. The secondary stage also comprises a direct current to direct current (DC/DC) converter 124. The DC/DC converter 124 receives a DC signal from the rectifier 123, and produces a DC output. The DC/DC converter 124 is configured to control the power used for charging the battery 130.

As stated above, the WPT system 100 is configured to have comparable input and output voltages. However, some applications may require significant differences between input and output voltages. For example, a battery of an electrically powered vehicle may operate at a relatively low voltage (e.g. 36 volts), whereas the charging station may be powered at a much higher voltage (e.g. 600 volts). Therefore, such WPT systems may be required to step-down the operating voltage. Further, such a voltage difference may mean that substantial currents are involved for high power charges. For example, 175 amps may be needed for a 10 kilowatt charge of a battery for a forklift truck. Handling such high currents may be difficult, particularly on the secondary side of the WPT system, since the secondary side may be included in a battery pack or other portable device. In particular, the large difference between input and output voltages can make it difficult to design, implement and/or operate the DC/DC converter in the secondary stage, such as the DC/DC converter 124 shown in FIG. 1.

The present disclosure seeks to address the above-mentioned problems. Alternatively or additionally, the present disclosure seeks to provide improved WPT systems and/or improved methods of controlling WPT systems.

SUMMARY

According to a first aspect, there is provided a method of controlling a wireless power transfer (WPT) system, the WPT system comprising a primary stage and a secondary stage, the primary stage comprising: a direct current to direct current (DC/DC) converter configured to generate a direct current (DC) output; a direct current to alternating current (DC/AC) inverter configured to receive the DC output from the DC/DC converter and to generate an alternating current (AC) output according to a variable switching frequency; and a primary coil configured to transfer power to the secondary stage in response to the DC/AC inverter generating the AC output, the method comprising: adjusting the switching frequency of the DC/AC inverter to cause a phase angle between an input current of the primary coil and an input voltage of the primary coil to be less than or equal to a predetermined threshold; and controlling the DC output of the DC/DC converter to cause a desired amount of power to be transferred from the primary coil at the adjusted switching frequency of the DC/AC inverter.

According to a second aspect, there is provided a wireless power transfer (WPT) system, the WPT system comprising a primary stage and a secondary stage, the primary stage comprising: a direct current to direct current (DC/DC) converter configured to generate a direct current (DC) output; a direct current to alternating current (DC/AC) inverter configured to receive the DC output from the DC/DC converter and to generate an alternating current (AC) output according to a variable switching frequency; and a primary coil configured to transfer power to the secondary stage in response to the DC/AC inverter generating the AC output, wherein the WPT system comprises a controller operable to: adjust the switching frequency of the DC/AC inverter to cause a phase angle between an input current of the primary coil and an input voltage of the primary coil to be less than or equal to a predetermined threshold; and control the DC output of the DC/DC converter to cause a desired amount of power to be transferred from the primary coil at the adjusted switching frequency of the DC/AC inverter.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 2:
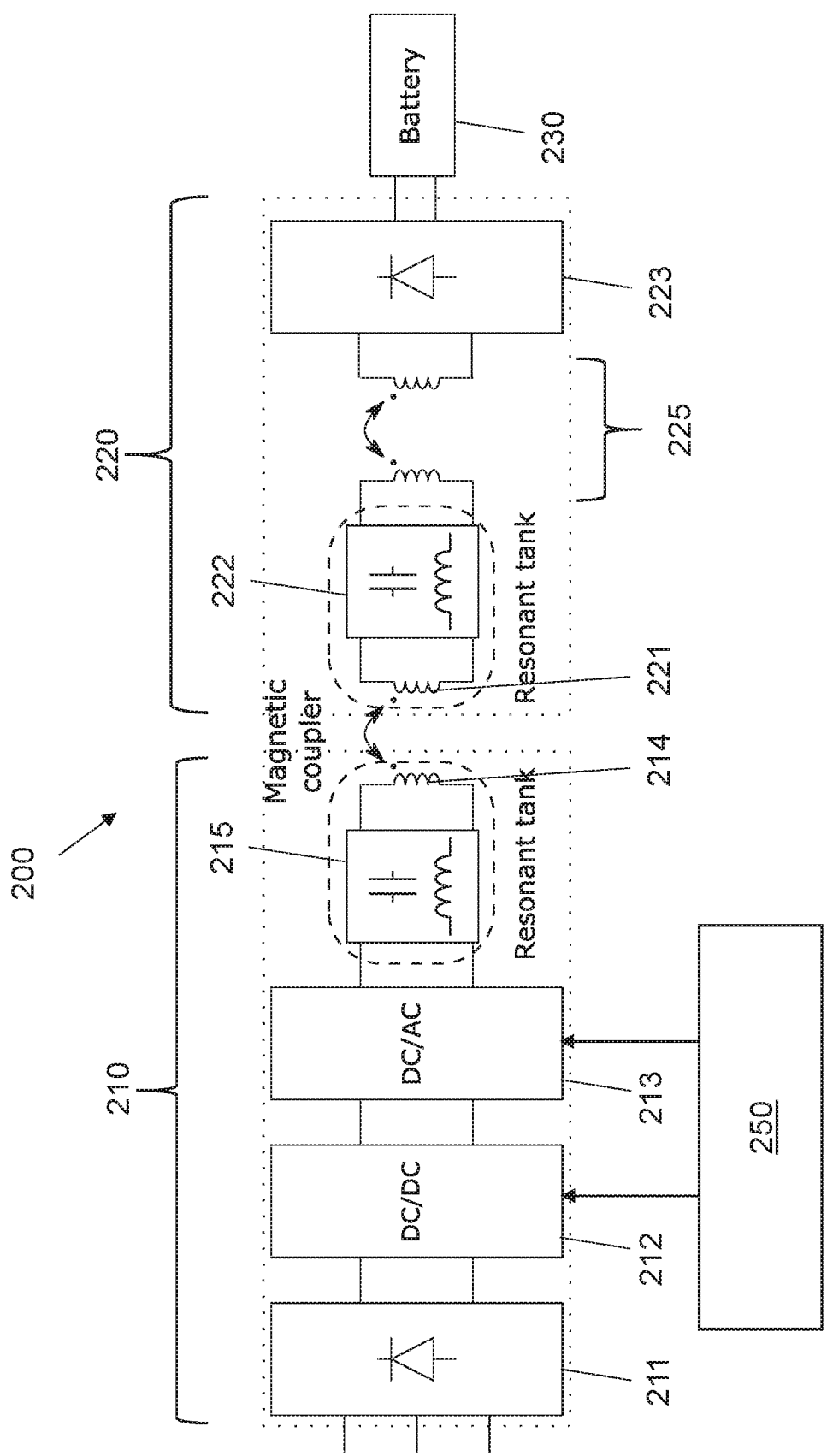
FIG. 2 shows a schematic diagram of a wireless power transfer system according to embodiments of the present disclosure.

Referring to FIG. 2, there is shown schematically a wireless power transfer (WPT) system 200 according to embodiments of the present disclosure. The WPT system 200 comprises a primary stage 210 and a secondary stage 220. The WPT system 200 may be suitable for charging the battery of an electrically powered vehicle, e.g. a forklift truck. In embodiments, the secondary stage 220 is included in or coupled to a battery pack equipment for an electrically powered vehicle. Such a battery pack equipment comprises at least one rechargeable battery 230. Such a battery pack equipment may be configured to be arranged within the electrically powered vehicle during charging of the battery 230, or may be configured to be arranged separately from the vehicle during charging of the battery 230. The primary stage 210 of the WPT system 200 may be arranged at a charging station, for example.

Figure 1:
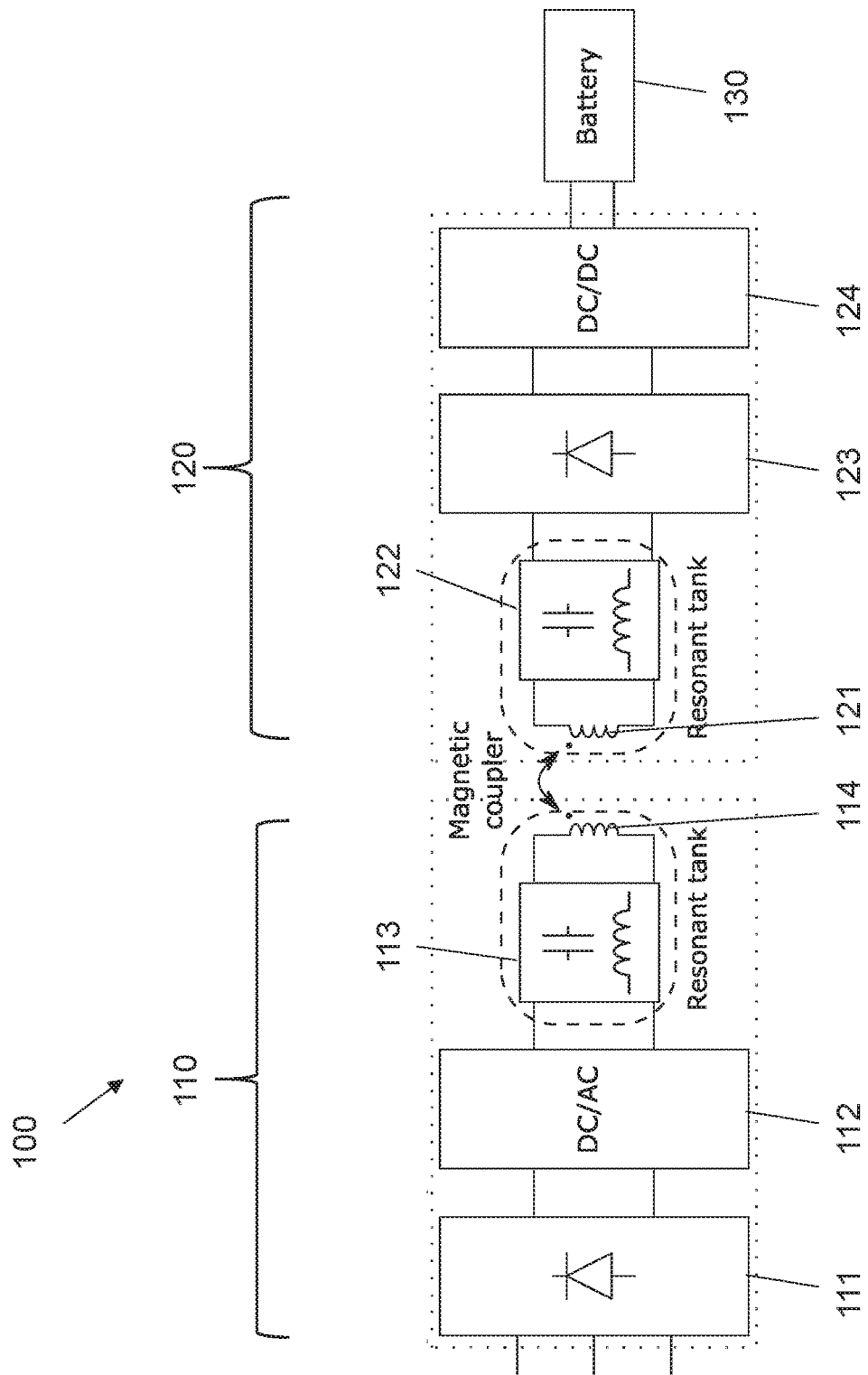
FIG. 1 shows a schematic diagram of a known wireless power transfer system.

The primary stage 210 of the WPT system 200 comprises a DC/DC converter 212. This is in contrast with the WPT system 100 described with reference to FIG. 1, in which the DC/DC converter 124 is arranged in the secondary stage 120. The DC/DC converter 212 is configured to generate a DC output. In embodiments, the DC/DC converter 212 comprises a buck converter, it being understood that other types of DC/DC converter may be used in other embodiments.

By arranging the DC/DC converter 212 in the primary stage 210, the significant voltage step-down required in certain scenarios (e.g. the charging of a battery for an electrically powered vehicle) can be performed separately from the DC/DC converter 212, in the secondary stage 220. By arranging the DC/DC converter 212 in the primary stage 210, as opposed to the secondary stage 220, the exposure of the DC/DC converter 212 to relatively high currents (due to the voltage step down during a high power charge) can be reduced. This improves the performance, efficiency and/or reliability of the DC/DC converter 212, and/or allows a relatively lightweight (as opposed to heavy duty) DC/DC converter 212 to be used, compared to a case in which the DC/DC converter 212 is arranged in the secondary stage 220 and required to handle significantly high currents. The DC/DC converter 212 may be used to control the amount of power transferred from the primary stage 210 to the secondary stage 220, as will be described in more detail below.

The primary stage 210 also comprises a DC/AC inverter 213. The DC/AC inverter 213 is configured to receive the DC output from the DC/DC converter 212. The DC/AC inverter 213 is configured to generate an AC output according to a variable switching frequency. This is in contrast with the WPT system 100 described with reference to FIG. 1, in which the DC/AC inverter 112 operates according to a fixed switching frequency, and in which the DC/AC inverter 112 does not receive a DC output from a DC/DC converter. The DC/AC inverter 213 may comprise a voltage source inverter or a current source inverter. Using a DC/AC inverter 213 with a variable switching frequency facilitates a reduction in resistive losses due to high resonant currents in the primary stage 210, as will be described below.

The primary stage 210 further comprises a primary coil 214. The primary coil 214 is configured to transfer power to the secondary stage 220. The primary coil 214 transmits power to the secondary stage 220 in response to the DC/AC inverter 213 generating the AC output. More than one primary coil may be used in some embodiments.

In embodiments, the primary stage 210 comprises a resonant tank 215 arranged between the DC/AC inverter 213 and the primary coil 214. The AC output of the DC/AC inverter 213 powers the resonant tank 215 which causes power to be transmitted from the primary coil 214 to the secondary stage 220. In some embodiments, the resonant tank 215 comprises at least one capacitor arranged in series with the primary coil 214. In alternative embodiments, the DC/AC inverter 213 powers the primary coil 214 directly, i.e. without a resonant tank.

In embodiments, the primary stage 210 also comprises a rectifier 211. The rectifier 211 is configured to rectify a 3-phase AC input signal. As such, the WPT system 100 is configured to receive a 3-phase electrical input, e.g. from an electrical grid. In some embodiments, the DC/DC converter 212 is arranged between the rectifier 211 and the DC/AC inverter 213. Therefore, the DC/DC converter 212 receives a rectified DC signal from the rectifier 211. In alternative embodiments, the primary stage 210 does not comprise the rectifier 211.

The WPT system 200 also comprises a controller 250. The controller 250 may comprise one or more components. The one or more components may be implemented in hardware and/or software. The one or more components may be co-located or may be located remotely from each other in the system 200. The controller 250 may be embodied as one or more software functions and/or hardware modules. In embodiments, the controller 250 comprises one or more processors configured to process instructions and/or data. Operations performed by the one or more processors may be carried out by hardware and/or software. In embodiments, the controller 350 comprises at least one volatile memory, at least one non-volatile memory, and/or at least one data storage unit. The volatile memory, non-volatile memory and/or data storage unit may be configured to store computer-readable information and/or instructions for use by one or more processors.

In embodiments, the controller 250 is comprised in the primary stage 210. In alternative embodiments, the controller 250 is communicatively coupled to the primary stage 210. Such a connection may be wired and/or wireless. For example, the controller 250 may be connected to the primary stage 210 via a network. In embodiments, the controller 250 is communicatively coupled to the DC/AC inverter 213 and the DC/DC converter 212. The controller 250 is configured to send and/or receive control signals to and/or from the DC/AC inverter 213 and the DC/DC converter 212.

The controller 250 is operable to adjust the switching frequency of the DC/AC inverter 213. The DC/AC inverter 213 thus has a variable switching frequency which can be adjusted using the controller 250. The switching frequency that is adjusted may comprise an active switching frequency. That is, the DC/AC inverter 213 can be actively switched at the adjusted switching frequency. The switching frequency of the DC/AC inverter 213 is adjusted to cause a phase angle between an input current of the primary coil 214 and an input voltage of the primary coil 214 to be less than or equal to a predetermined threshold. In other words, the switching frequency of the DC/AC inverter 213 is adjusted to reduce a phase shift between the input current and the input voltage of the primary coil 214. Therefore, adjusting the switching frequency of the DC/AC inverter 213 can cause the input current and voltage of the primary coil 214 to be relatively in phase, compared to a case in which such adjusting does not occur. Adjusting the switching frequency of the DC/AC inverter 213 is based on a desired phase angle between the input current of the primary coil 214 and the input voltage of the primary coil 214. The desired phase angle may correspond to the predetermined threshold in some embodiments. In embodiments, the switching frequency is adjusted using a control loop. The phase angle is measured, and a corrector adjusts the switching frequency based on the measured phase angle (i.e. to put the phase shift below or equal to a predetermined threshold). In embodiments, the phase angle is measured on-line. In alternative embodiments, a pre-configured look-up table may be used to map frequency to phase angle for a given power value.

By causing the phase angle between the input current of the primary coil 214 and the input voltage of the primary coil 214 to be less than or equal to the predetermined threshold, the effective current in the primary coil 214 can be reduced, for a given range of power. In other words, for a given amount of transferred power, decreasing the phase shift between the input current and input voltage of the primary coil 214 causes the amplitude of the resonant current in the primary coil 214 to be reduced. This allows for a reduction in resistive losses and therefore an increase in the efficiency of the WPT system 200.

The controller 250 is further operable to control the DC output of the DC/DC converter 212 to cause a desired amount of power to be transferred from the primary coil 214 at the adjusted switching frequency of the DC/AC inverter 213. Controlling the DC output of the DC/DC converter 212 may involve adjusting the DC output in some examples, or maintaining a fixed DC output. In embodiments, the output voltage of the DC/DC converter 212 is controlled. In alternative embodiments, the output current of the DC/DC converter 212 is controlled. In embodiments, the current going through the battery is measured. If the measured current is below a reference value, a signal is sent to the DC/DC converter 212. The duty cycle of the transistors is adjusted (which adjusts the DC output voltage) based on the battery current. Different methods of controlling the DC/DC converter 212 may be used in other embodiments, e.g. depending on the type of DC/DC converter used.

As such, the transferred power from the primary coil 214 is regulated by the DC output of the DC/DC converter 212, once the effective current in the primary coil 214 has been reduced by adjusting the switching frequency of the DC/AC inverter 213. Therefore, in embodiments the controller 250 is configured to perform a two-stage control process. In the first stage, the switching frequency of the DC/AC inverter 213 is controlled to achieve a desired phase angle between the input current and voltage of the primary coil 214; in the second stage, the DC output of the DC/DC converter 212 is controlled to achieve a desired amount of power transferred from the primary coil 214 at the adjusted switching frequency of the DC/AC inverter 213. This provides a flexible and efficient control mechanism for a WPT system in which a DC/DC converter is arranged in the primary stage, rather than the secondary stage, thus avoiding exposure of the DC/DC converter to high currents arising from high power charges involving a significant operating voltage step-down in the secondary stage.

In embodiments, the secondary stage 220 of the WPT system 200 is coupled to a rechargeable battery 230. The secondary stage 220 comprises a secondary coil 221. The secondary coil 221 is coupled to the primary coil 214 of the primary stage 210. For example, the secondary coil 221 may be magnetically coupled to the primary coil 214. The secondary coil 221 is configured to receive power transferred from the primary coil 214.

In embodiments, the secondary stage 220 also comprises a high-voltage low-voltage (HVLV) transformer 225. The HVLV transformer 225 is arranged between the secondary coil 221 and the battery 230. The HVLV transformer 225 is operable to manage a reduction in operating voltage because the secondary stage 220 is arranged to receive a high voltage from the primary stage 210 (e.g. up to 650 volts), and may need to charge the battery 230 at a low voltage (e.g. at 24, 36 or 48 volts). Therefore, the HVLV transformer 225 is arranged to adapt a relatively high voltage in the secondary coil 221 to a relatively low battery voltage. By arranging a HVLV transformer between the secondary coil 221 and the battery 230, the exposure of the secondary coil 221 to high currents (associated with high power charges where there is a significant difference between input and output voltages of the WPT system 200) is reduced.

In embodiments, the secondary stage 220 also comprises a rectifying stage 223 arranged between the HVLV transformer 225 and the battery 230. The rectifying stage 223 is configured to rectify the power from the resonant tank 222 of the secondary stage 220.

In embodiments, the HVLV transformer 225 comprises a center-tapped full-wave rectifier. In some embodiments, such a center-tapped full-wave rectifier encompasses the HVLV transformer 225 and the rectifying stage 223. In alternative embodiments, the secondary stage 220 does not comprise an HVLV transformer. The voltage reduction may be managed alternatively by a buck converter. However, the HVLV transformer 225 in the form of a center-tapped full-wave rectifier may manage losses more effectively than a buck converter, particularly when handling high currents.

In embodiments, the output of the HVLV transformer 225 and rectifier 223 is determined by the charging voltage of the battery 230. In embodiments, the turn-ratio of the HVLV transformer 225 and/or the resonant inductance in the secondary stage 220 is selected to facilitate the transferred power regulation based on the control of the DC/DC converter 212. Additionally or alternatively, the turn-ratio of the HVLV transformer 225 and/or the resonant inductance is selected such that the operating voltage is as high as possible (within the limits set by the DC output of the DC/DC converter 212), in order to minimise resonant currents and thereby reduce resistive losses.

The WPT system 200 may comprise more, fewer and/or different components in alternative embodiments.

Power consumed by a load (e.g. the rechargeable battery 230) may be considered to be active power. To transfer a given amount of active power to the load, the DC/AC inverter 213 is required to provide this power to the primary coil 214. If the phase angle between the current and the voltage in the primary coil 214 exceeds the predetermined threshold, the DC/AC inverter 213 provides active power and reactive power. However, the load consumes only the active power. Therefore, the reactive power caused by the phase shift results in a higher current, which may cause additional resistive losses. If the phase angle is less than or equal to the predetermined threshold, however, the reactive power produced by the DC/AC inverter 213 is reduced, and in some cases avoided altogether. As such, the DC/AC inverter 213 can effectively provide only active power in such cases. Therefore, the resonant current in the primary coil 214 is reduced, and resistive losses are also reduced. In other words, the active power for the first harmonic may be given by $P=V \times I \cos(\text{phase})$. If the voltage V is fixed, an increase in phase results in a decrease in $\cos(\text{phase})$, and therefore to maintain a given power P, an increase in current I occurs. Whereas, if the phase is decreased, $\cos(\text{phase})$ increases, allowing for a reduction in current I to produce the same power P.

Therefore, the WPT system 200 described herein is able to efficiently and flexibly carry out high power charges which require a significant step down in operating voltage (e.g. for charging the battery of an electrically-powered vehicle), whilst minimising resistive losses.

Figure 3A:
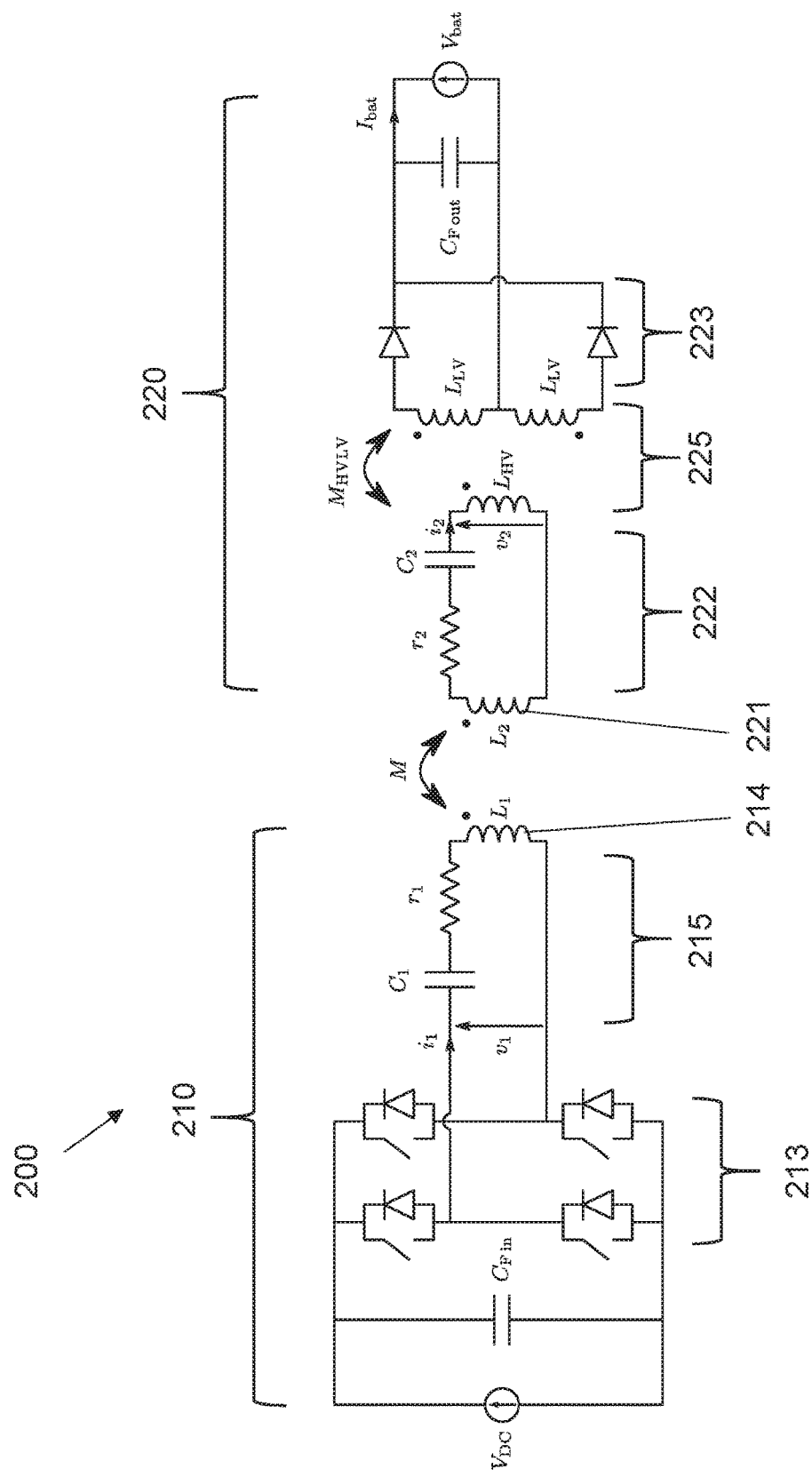
FIGS. 3A and 3B show circuit diagrams of the wireless power transfer system shown in FIG. 2 in first and second configurations, respectively.
Figure 3B:
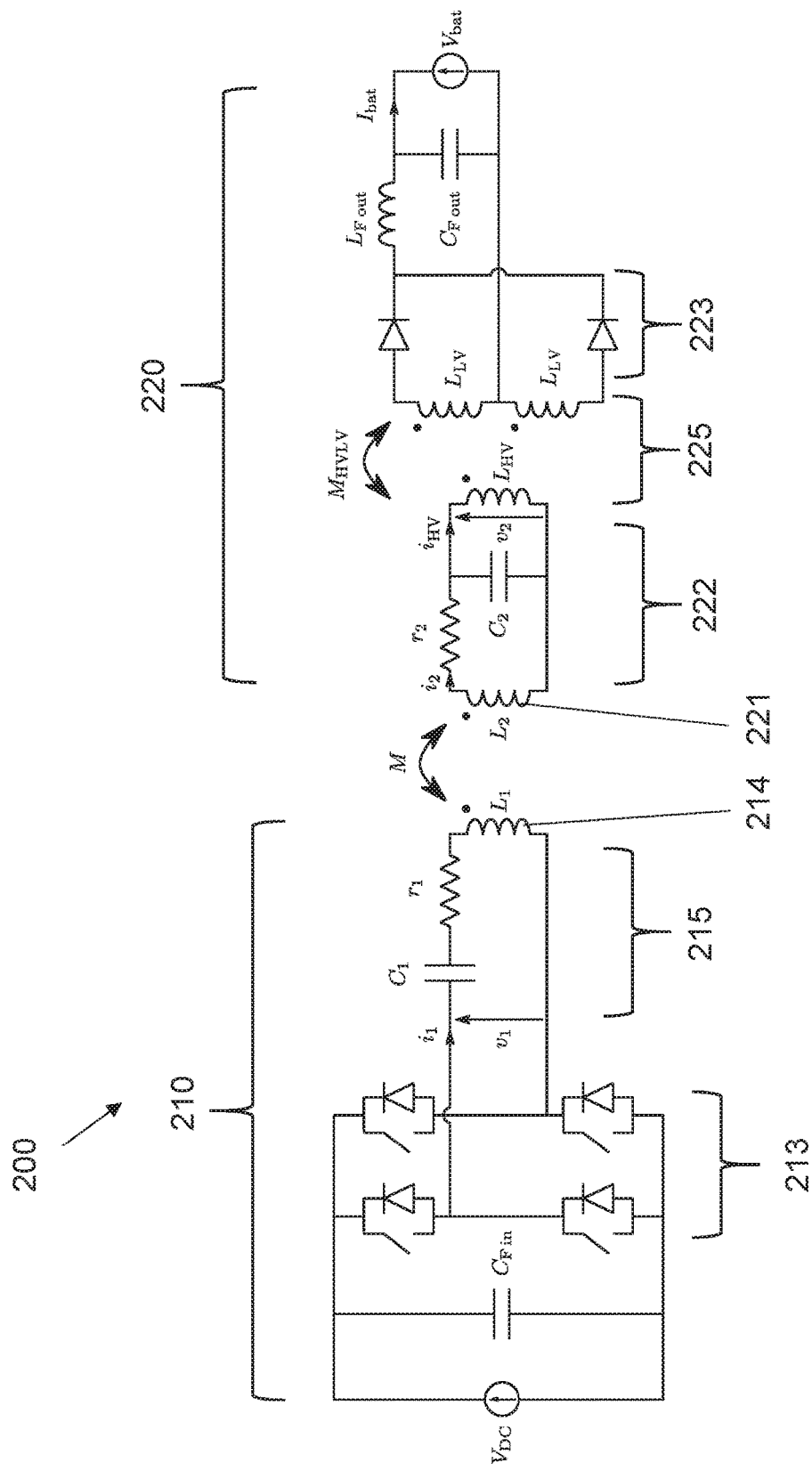

Referring to FIGS. 3A and 3B, there is shown the WPT system 200 in first configuration and second configurations, respectively. $V_{DC}$ represents the DC output of the DC/DC converter 212, which may be controlled, e.g. by the controller 250. In the first configuration, the resonant tank 222 in the secondary stage 220 comprises a capacitor, $C_2$, arranged in series with the secondary coil 221. In the second configuration, the resonant tank 222 in the secondary stage 220 comprises a capacitor, $C_2$, arranged in parallel with the secondary coil 221.

In the embodiments shown in FIGS. 3A and 3B, the resonant tank 215 in the primary stage 210 comprises a capacitor, $C_1$, arranged in series with the primary coil 214. Arranging the capacitor, $C_1$, in series with the primary coil 214 enables a reduction in resistive losses (due to high resonant currents) compared to a case in which the capacitor, $C_1$, is arranged in parallel with the primary coil 214. In alternative embodiments, the capacitor, $C_1$, is arranged in parallel with the primary coil 214. In such embodiments, the DC/AC inverter 213 may comprise a current source inverter.

In the embodiments shown in FIGS. 3A and 3B, the primary stage 210 comprises a smoothing capacitor, $C_{Fin}$, arranged between the DC/DC converter 212 and the DC/AC inverter 213. The smoothing capacitor is configured to smooth the output of the DC/DC converter 212. The output of the DC/DC converter 212 may be more stable (i.e. less varying) through use of the smoothing capacitor. The primary stage 210 may comprise a plurality of smoothing capacitors in some embodiments. In alternative embodiments, the primary stage 210 does not comprise any smoothing capacitors.

In each of the first and second configurations of FIGS. 3A and 3B, the secondary stage 220 comprises a center-tapped full-wave rectifier. The center-tapped full-wave rectifier includes the HVLV transformer 225 and a rectifying stage 223. The center-tapped full-wave rectifier is configured to step down the operating voltage in the secondary stage 220 of the WPT system 200 whilst minimising losses.

Figure 4:
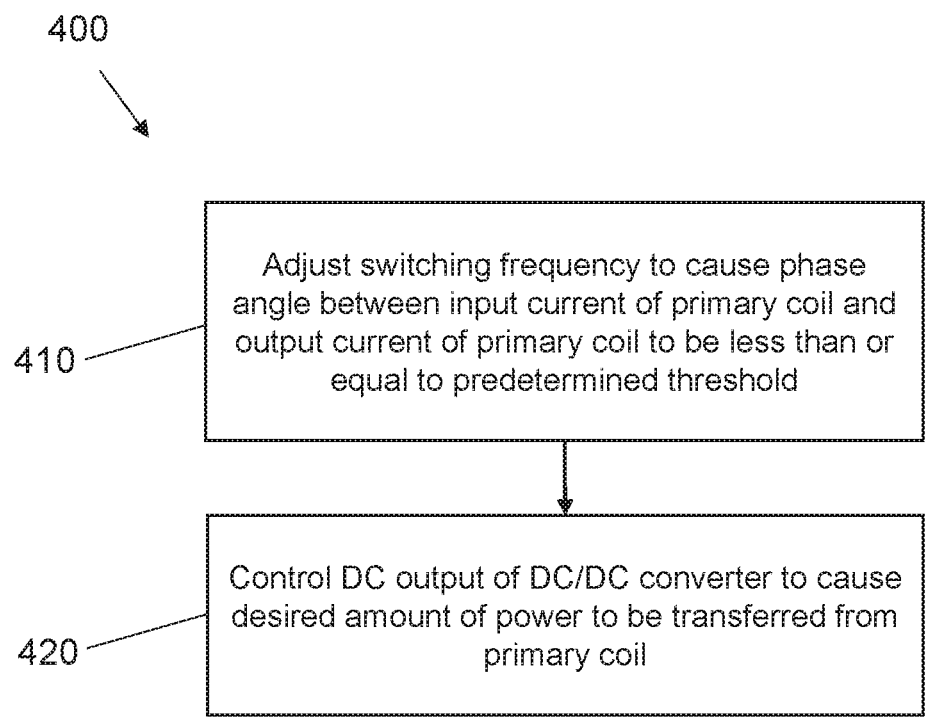
FIG. 4 shows a flow diagram depicting a method of controlling a wireless power transfer system according to embodiments of the present disclosure.

Referring to FIG. 4, there is shown a method 400 of controlling a WPT system according to embodiments of the present disclosure. The method 400 may be used to control the WPT system 200 described above. In some examples, at least part of the method 400 is performed by the controller 250. As such, the method 400 may comprise operations performed by hardware and/or software. In some cases, at least part of the method 400 comprises one or more computer processes performed in processing systems or processors. Examples described herein also extend to computer programs, for example computer programs on or in a carrier, adapted for putting the method into practice. The carrier may be any entity or device capable of carrying the program.

The method 400 is for controlling a WPT system comprising a primary stage and a secondary stage. The primary stage comprises a DC/DC converter configured to generate a DC output. The primary stage also comprises a DC/AC inverter configured to receive the DC output from the DC/DC converter and to generate an AC output according to a variable switching frequency. The primary stage also comprises a primary coil configured to transfer power to the secondary stage in response to the DC/AC inverter generating the AC output.

The method 400 comprises, at item 410, adjusting the switching frequency of the DC/AC inverter to cause a phase angle between an input current of the primary coil and an input voltage of the primary coil to be less than or equal to a predetermined threshold. By causing the phase angle between the input current of the primary coil and the input voltage of the primary coil to be less than or equal to the predetermined threshold, the amplitude of the resonant current in the primary coil may be reduced, thereby reducing resistive losses and increasing efficiency.

In some embodiments, the switching frequency of the DC/AC inverter is adjusted to match the phase angle between the input current of the primary coil and the input voltage of the primary coil to the predetermined threshold. Therefore, the predetermined threshold may represent a desired phase angle in such embodiments. In other embodiments, the switching frequency of the DC/AC inverter is adjusted to ensure that the phase angle is below the predetermined threshold. That is, the predetermined threshold may represent an upper limit for the phase angle. In some embodiments, the switching frequency of the DC/AC inverter is adjusted to minimise the phase angle. That is, the input current of the primary coil and the input voltage of the primary coil may be put substantially in phase. In other words, an approximately zero phase shift between the input current of the primary coil and the input voltage of the primary coil may be obtained by adjusting the switching frequency of the DC/AC inverter.

In embodiments, the predetermined threshold is 25°. Using a phase angle between the input current of the primary coil and the input voltage of the primary coil at or below 25° enables an effective current in the primary coil to be reduced, e.g. by reducing an amount of reactive power generated by the DC/AC inverter. In embodiments, the predetermined threshold is 20°. In some embodiments, the predetermined threshold is 15°. Using a phase angle of approximately 15° enables effective zero voltage switching and/or energy exchange between switch parasitic capacitances. Such a phase angle may additionally enable reverse recovery currents in body-diodes to be reduced. The predetermined threshold and/or the desired phase angle may have other values in other embodiments.

In embodiments, the switches of the DC/AC inverter are semiconductor switches. These present different parasitic capacitances. For effective zero voltage switching to be achieved, a minimum current should flow through a given switch at the moment of switching, in order to properly discharge those capacitances before short-circuiting the switch. Avoiding voltage overshoot during switching may be a consideration, e.g. for electromagnetic compatibility purposes. The body-diode is anti-parallel to each switch. Hence, if the phase angle is set to zero, when a switch is open, the current will flow through a diode, then change direction, so it flows through another diode, and then a switch is short-circuited, and the current will flow through this switch. Since the diode is blocked while having some current passing through it, the phenomenon of reverse recovery may occur, which can produce losses and electromagnetic compatibility issues. Maintaining a positive phase angle enables this changing of direction of current through the diodes to be reduced (and in some cases avoided), since the current is switched before going to zero.

In embodiments, the adjusting is based on the desired amount of power to be transferred from the primary coil. That is, the adjusting may be dependent on both the predetermined threshold for the phase angle and the desired amount of power. For example, the desired amount of power may be taken into account when adjusting the switching frequency of the DC/AC inverter. In some cases, the desired amount of power to be transferred from the primary coil is based on a charging power and/or voltage of a battery coupled to the secondary stage of the WPT system. As such, the adjusting of the switching frequency of the DC/AC inverter may be dependent on the type of battery that is to be charged. Therefore, the control of the WPT system may be adapted to suit different types of battery and/or charge. In some examples, the adjusting may be performed differently for different desired amounts of power. In some examples, the relationship between switching frequency and phase angle is different for different desired amounts of power. The phase angle between the input current and input voltage of the primary coil may be dependent on both the switching frequency of the DC/AC inverter and the desired amount of power, according to embodiments.

In embodiments, the adjusting comprises selecting a switching frequency from a discrete set of switching frequencies. Each member of the discrete set of switching frequencies is useable, for the desired amount of power that is to be transferred from the primary coil, to cause the phase angle to be less than or equal to the predetermined threshold. In other words, multiple different frequencies may be selectable to achieve the desired phase angle, for a given power value. For example, each of 60 kHz, 70 kHz and 80 kHz may be useable to obtain the desired phase angle for a given amount of output power. The selected switching frequency may be used as the switching frequency of the DC/AC inverter. Some switching frequencies from the discrete set may be better suited (e.g. in terms of providing better performance and/or efficiency of the WPT system) than other switching frequencies from the discrete set. For example, different switching frequencies from the discrete set may have different performance characteristics. A particular switching frequency may be selected from the discrete set based on the performance characteristic of that switching frequency and/or of other switching frequencies in the discrete set. Examples of such performance characteristics include, but are not limited to, an amount of current generated in the primary coil and an amount of resistive loss at a given switching frequency. In some examples, a given switching frequency is selected from the discrete set based on the given switching frequency being above a predetermined threshold frequency.

In embodiments, the selected switching frequency comprises a maximum switching frequency from the discrete set of switching frequencies. For example, where the discrete set comprises 60 kHz, 70 kHz and 80 kHz, 80 kHz may be selected. The switching frequency may be selected based on that switching frequency being higher than other switching frequencies in the discrete set. The maximum switching frequency from the discrete set may comprise a switching frequency that is below a maximum possible switching frequency at which the DC/AC inverter can be actively switched.

In some embodiments, one or more switching frequencies from the discrete set may be useable to obtain the desired phase angle only for amounts of transfer power below a particular value (i.e. an upper limit of transfer power). Such switching frequencies may comprise switching frequencies other than the maximum switching frequency from the discrete set. Therefore, by selecting the maximum switching frequency from the discrete set, a greater range of transfer power values may be produced.

Further, selecting the maximum switching frequency from the discrete set may result in a superior electrical performance of the WPT system compared to a case in which a different switching frequency is selected. For example, selecting the maximum switching frequency from the discrete set may reduce resistive losses in the primary coil, thereby increasing efficiency.

Moreover, using the maximum switching frequency from the discrete set may facilitate the control of the transferred power from the primary coil based on control of the DC output of the DC/DC converter. For example, above a predetermined threshold frequency, the relationship between the DC output of the DC/DC converter and the transferred power from the primary coil may be monotonic, such that a single value of the DC output of the DC/DC converter produces a given value of transferred power from the primary coil. Below the threshold frequency, more than one discrete value of the DC output may be able to produce the same value of transferred power. Thus, by using switching frequencies above the threshold frequency (e.g. the maximum frequency from the discrete set), accurate and reliable regulation of the transferred power via control of the DC output of the DC/DC converter may be facilitated. In alternative embodiments, a switching frequency other than the maximum switching frequency is selected from the discrete set.

In embodiments, the adjusting comprises determining a sub-range of switching frequencies. The sub-range is narrower than a full operating range of switching frequencies useable by the DC/AC inverter. The sub-range may, for example, have a bandwidth of approximately 5 kHz, 10 kHz or 15 kHz. The sub-range may be determined based on the desired amount of power to be transferred from the primary coil. In some examples, the sub-range is determined such that, within the sub-range, a single switching frequency is useable to cause the input current and input voltage of the primary coil to have a desired phase shift. This may simplify the frequency adjustment process, and/or improve the accuracy of such. In examples, the sub-range has a minimum value that is greater than the minimum value of the full operating range. The sub-range may be an upper frequency range relative to a further, lower, frequency range. The switching frequency of the DC/AC inverter may be varied within the sub-range until the phase angle is less than or equal to the predetermined threshold. The use of the sub-range thus allows the switching frequency to be adjusted with a greater accuracy. In alternative embodiments, the sub-range of switching frequencies is not determined.

At item 420, the DC output of the DC/DC converter is controlled to cause a desired amount of power to be transferred from the primary coil at the adjusted switching frequency of the DC/AC inverter. In embodiments, the output voltage of the DC/DC converter is controlled. In embodiments, the DC output of the DC/DC converter is adjusted to control the power that is transferred from the primary coil. Therefore, both the switching frequency of the DC/AC inverter and the DC output of the DC/DC converter may be adjusted as part of the WPT control process.

In embodiments, the secondary stage of the WPT system is coupled to a rechargeable battery. In such embodiments, the controlling the DC output of the DC/DC converter is based on a desired charging power for the battery. For example, the desired amount of power to be transferred from the primary coil may be based on the electrical characteristics (e.g. charging power and/or voltage) of the particular battery that is to be charged. This in turn influences the control of the DC/DC converter.

The steps of the method 400 may be performed in a different order in alternative embodiments. For example, the controlling step 420 may be performed prior to the adjusting step 410 in some embodiments. The method 400 may be performed prior to a charging operation (e.g. in a calibration phase), or may be performed during a charging operation.

Figure 5:
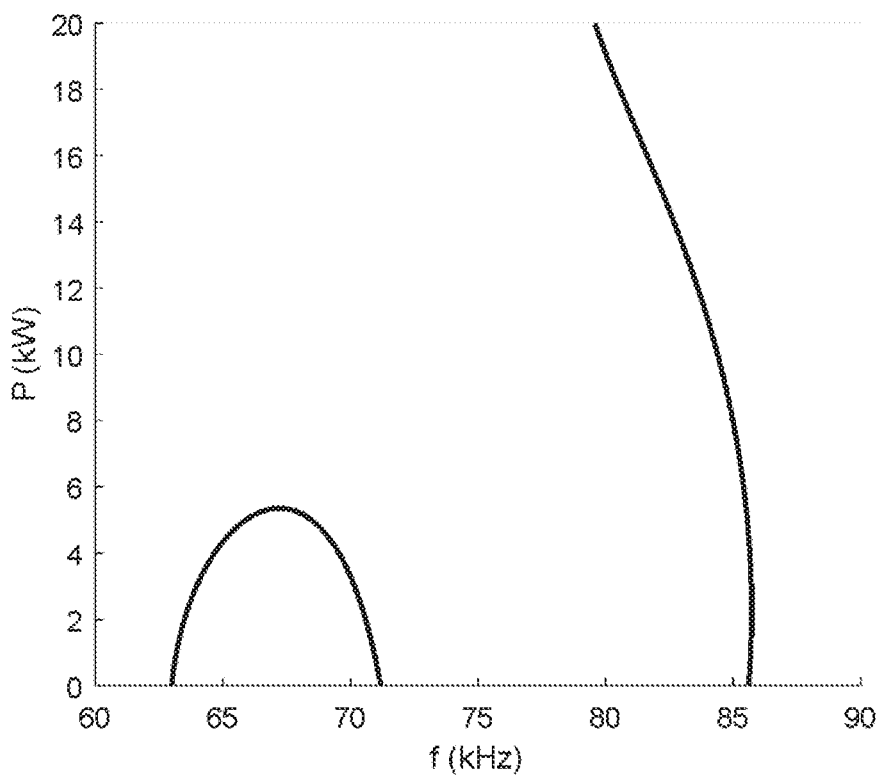
FIG. 5 shows a graph of power versus frequency according to embodiments of the present disclosure.

Referring to FIG. 5, there is shown a graph 500 depicting a relationship between transferred power from the primary coil (on the y-axis) and switching frequency of the DC/AC inverter (on the x-axis), for a phase angle of 15° between the input current and input voltage of the primary coil. As can be seen in FIG. 5, for some values of transferred power (e.g. below approximately 6 kW), there are three discrete switching frequencies which satisfy the 15° phase angle. For example, for a power of 4 kW, frequencies of 64 kHz, 69 kHz and 86 kHz cause the phase angle to be 15°. However, for powers above approximately 6 kW, only one frequency causes the phase angle to be 15°. For example, for a power of 8 kW, a frequency of 85 kHz causes the phase angle to be 15°. When the desired amount of power to be transferred is relatively low (e.g. below approximately 6 kW), the switching frequency of the DC/AC inverter may be selected from the upper frequency range (e.g. above 75 kHz). In the embodiment shown in FIG. 5, the primary and secondary coils have a coupling factor of −0.3.

Figure 6A:
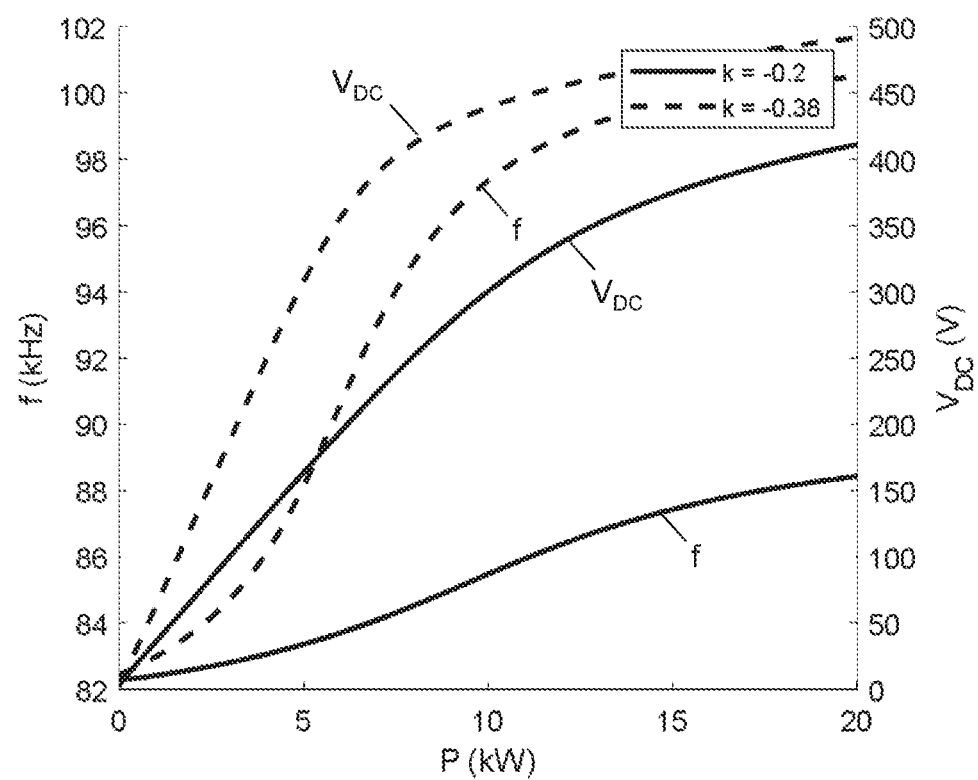
FIGS. 6A and 6B show graphs of frequency and DC voltage versus power according to embodiments of the present disclosure.

FIG. 6A shows a graph 600 depicting relationships between the switching frequency of the DC/AC inverter (on the y-axis) and the transferred power from the primary coil (on the x-axis), and relationships between the DC output of the DC/DC converter (on the y-axis) and the transferred power from the primary coil (on the x-axis). The graph 600 shown in FIG. 6A corresponds to the first configuration of the WPT system 200 described above with reference to FIG. 3A. In the graph 600, the phase angle between the input current and input voltage of the primary coil is 15°. Dashed lines represent relationships when the coupling factor between primary and secondary coils is −0.2, and solid lines represent relationships when the coupling factor is −0.38.

Figure 6B:
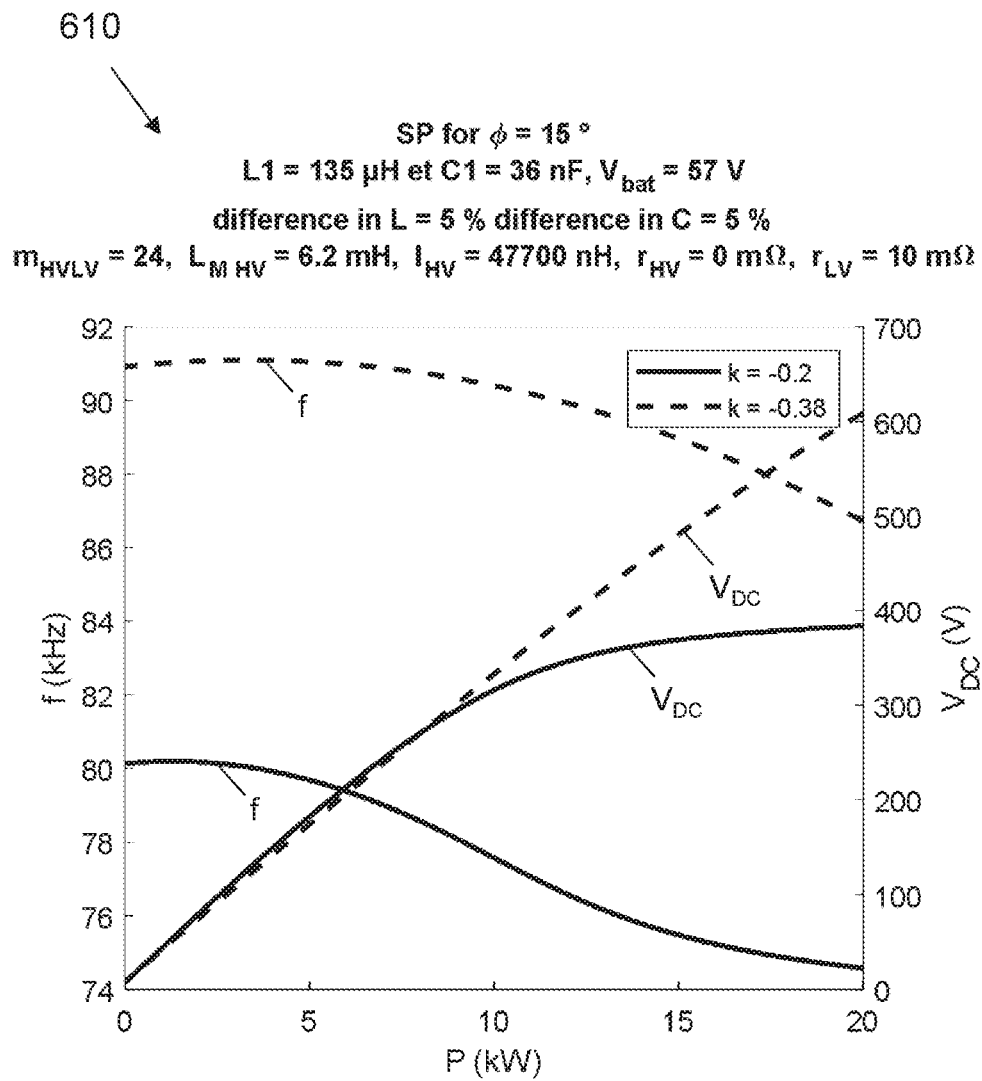

FIG. 6B shows a graph 610 depicting relationships between the switching frequency of the DC/AC inverter (on the y-axis) and the transferred power from the primary coil (on the x-axis), and relationships between the DC output of the DC/DC converter (on the y-axis) and the transferred power from the primary coil (on the x-axis). The graph 610 shown in FIG. 6B corresponds to the second configuration of the WPT system 200 described above with reference to FIG. 3B. In the graph 610, the phase angle between the input current and input voltage of the primary coil is 15°. Dashed lines represent relationships when the coupling factor between primary and secondary coils is −0.2, and solid lines represent relationships when the coupling factor is −0.38.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments of the present disclosure, the switching frequency of the DC/AC inverter 213 is adjusted to cause a phase angle between an input current of the primary coil 214 and an input voltage of the primary coil 214 to be less than or equal to a predetermined threshold. In alternative embodiments, the switching frequency of the DC/AC inverter 213 is controlled (e.g. by the controller 250), but the switching frequency is not adjusted. For example, a previously selected switching frequency may be maintained by the controller 250.

In some embodiments, the WPT system 200 is for charging a battery of a forklift truck. In alternative embodiments, the WPT system 200 is for charging a battery of different types of vehicle. For example, the WPT system 200 may be used with electrically powered cars, buses, scooters, aircraft, marine vehicles, etc. In alternative embodiments, the WPT system 200 is for charging batteries of entities other than vehicles. In alternative embodiments, the WPT system 200 is used for power transfer scenarios other than those relating to charging.

In embodiments, the secondary stage 220 comprises an HVLV transformer. In alternative embodiments, the secondary stage 220 comprises a Low-Voltage High-Voltage (LVHV), or 'step-up', transformer.

In embodiments, the primary stage 210 of the WPT system 200 comprises a DC/DC converter 212. In alternative embodiments, the primary stage 210 does not comprise such a DC/DC converter 212. In such alternative embodiments, the DC/AC inverter 213 may receive a DC output from the rectifier 211 directly, rather than via the DC/DC converter 212. The DC output from the rectifier 211 may be controlled in a similar manner to the DC output of the DC/DC converter 212 described above, in order to cause the desired amount of power to be transferred from the primary coil 214.

Where in the foregoing description, integers or elements are mentioned which have known, obvious or foreseeable equivalents, then such equivalents are herein incorporated as if individually set forth. It will also be appreciated that integers or features of the present disclosure that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g. by applying relevant portions of that disclosure.

The invention claimed is:

1. A method of controlling a wireless power transfer (WPT) system, the WPT system comprising a primary stage and a secondary stage, the primary stage comprising:
   a direct current to direct current (DC/DC) converter configured to generate a direct current (DC) output;
   a direct current to alternating current (DC/AC) inverter configured to receive the DC output from the DC/DC converter and to generate an alternating current (AC) output according to a variable switching frequency; and
   a primary coil configured to transfer power to the secondary stage in response to the DC/AC inverter generating the AC output, the method comprising:
   adjusting the switching frequency of the DC/AC inverter to obtain a phase angle between an input current of the primary coil and an input voltage of the primary coil that is less than or equal to a predetermined threshold for a desired amount of power to be transferred from the primary coil; and
   in response to adjusting the switching frequency of the DC/AC inverter, adjusting a voltage level of the DC output of the DC/DC converter to cause the desired amount of power at the obtained phase angle to be transferred from the primary coil at the adjusted switching frequency of the DC/AC inverter.

2. The method according to claim 1, wherein the adjusting of the switching frequency of the DC/AC inverter is further based on the desired amount of power to be transferred from the primary coil.

3. The method according to claim 1, wherein the adjusting of the switching frequency of the DC/AC inverter comprises:
   selecting a switching frequency from a discrete set of switching frequencies, each member of the discrete set of switching frequencies being useable, for the desired amount of power that is to be transferred from the primary coil, to obtain the phase angle that is less than or equal to the predetermined threshold; and
   using the selected switching frequency as the switching frequency of the DC/AC inverter.

4. The method according to claim 3, wherein the selected switching frequency comprises a maximum switching frequency from the discrete set of switching frequencies.

5. The method according to claim 1, wherein the adjusting of the switching frequency of the DC/AC inverter comprises:
   determining, based on the desired amount of power to be transferred from the primary coil, a sub-range of switching frequencies; and
   varying the switching frequency of the DC/AC inverter within the sub-range until the phase angle between the input current of the primary coil and the input voltage of the primary coil is less than or equal to the predetermined threshold.

6. The method according to claim 1,
   wherein the secondary stage is coupled to a rechargeable battery, and
   wherein the controlling the DC output of the DC/DC converter is based on a desired charging power for the rechargeable battery.

7. The method according to claim 1, wherein the predetermined threshold is 25°.

8. The method according to claim 1, wherein the predetermined threshold is 15°.

9. A wireless power transfer (WPT) system, the WPT system comprising a primary stage and a secondary stage, the primary stage comprising:
   a direct current to direct current (DC/DC) converter configured to generate a direct current (DC) output;
   a direct current to alternating current (DC/AC) inverter configured to receive the DC output from the DC/DC converter and to generate an alternating current (AC) output according to a variable switching frequency; and
   a primary coil configured to transfer power to the secondary stage in response to the DC/AC inverter generating the AC output,
   wherein the WPT system comprises a controller operable to:
   adjust the switching frequency of the DC/AC inverter to obtain a phase angle between an input current of the primary coil and an input voltage of the primary coil that is less than or equal to a predetermined threshold for a desired amount of power to be transferred from the primary coil; and
   in response to adjusting the switching frequency of the DC/AC inverter, adjust a voltage level of the DC output of the DC/DC converter to cause the desired amount of power at the obtained phase angle to be transferred from the primary coil at the adjusted switching frequency of the DC/AC inverter.

10. The WPT system according to claim 9, wherein the primary stage comprises a resonant tank arranged between the DC/AC inverter and the primary coil.

11. The WPT system according to claim 10, wherein the resonant tank comprises at least one capacitor arranged in series with the primary coil.

12. The WPT system according to claim 9, wherein the primary stage comprises a rectifier configured to rectify a 3-phase AC input signal, the DC/DC converter being arranged between the rectifier and the DC/AC inverter.

13. The WPT system according to claim 9, wherein the primary stage comprises at least one smoothing capacitor arranged between the DC/DC converter and the DC/AC inverter, the at least one smoothing capacitor configured to smooth the output of the DC/DC converter.

14. The WPT system according to claim 9, wherein the secondary stage is coupled to a rechargeable battery, the secondary stage comprising:
   a secondary coil coupled to the primary coil of the primary stage, the secondary coil configured to receive power transferred from the primary coil; and
   a high-voltage low-voltage (HVLV) transformer arranged between the secondary coil and the rechargeable battery.

15. The WPT system according to claim 14, wherein the HVLV transformer comprises a center-tapped full-wave rectifier.

16. The WPT system according to claim 14, wherein the secondary stage comprises a resonant tank arranged between the secondary coil and the HVLV transformer.

* * * * *